Patented June 9, 1936

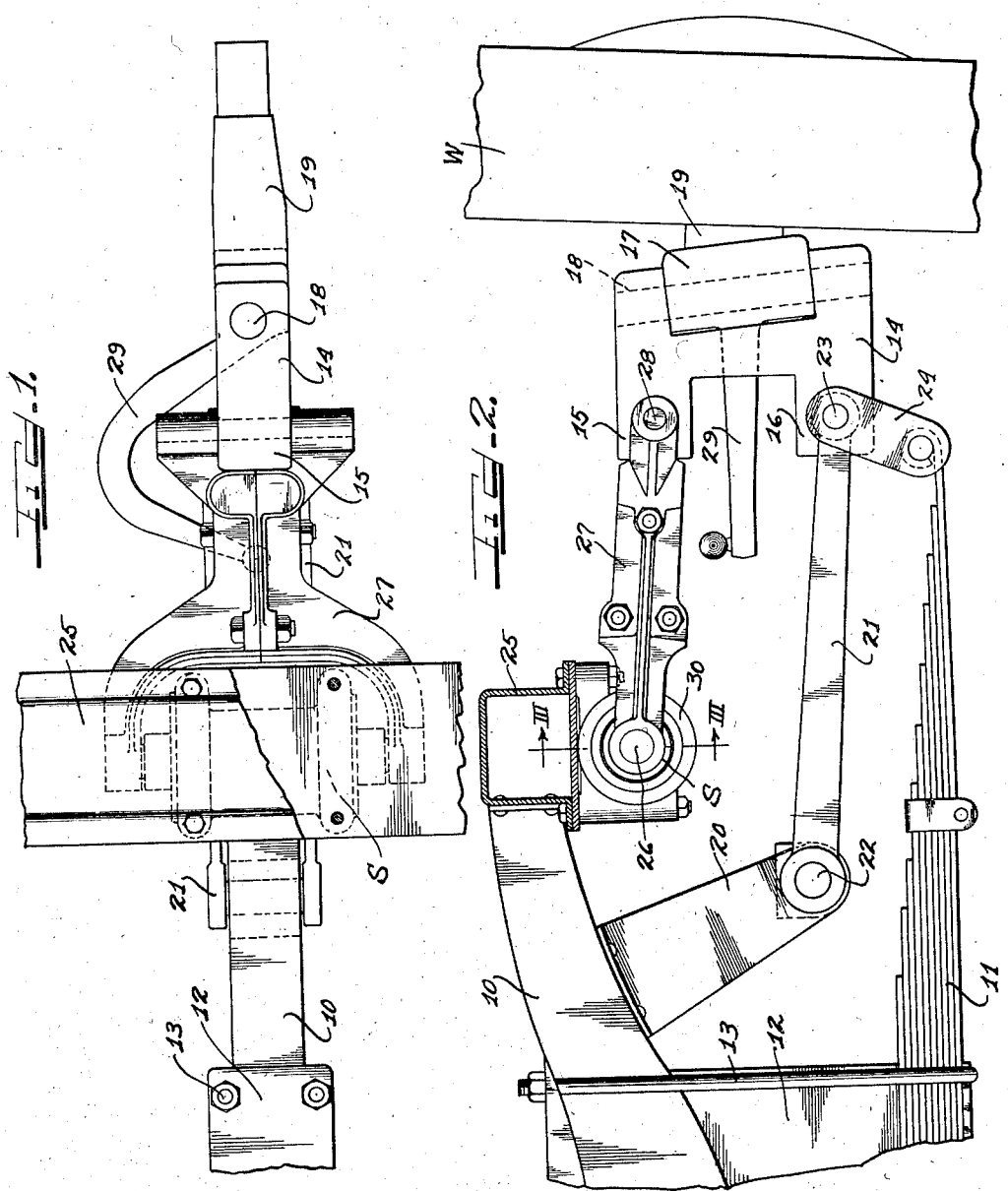

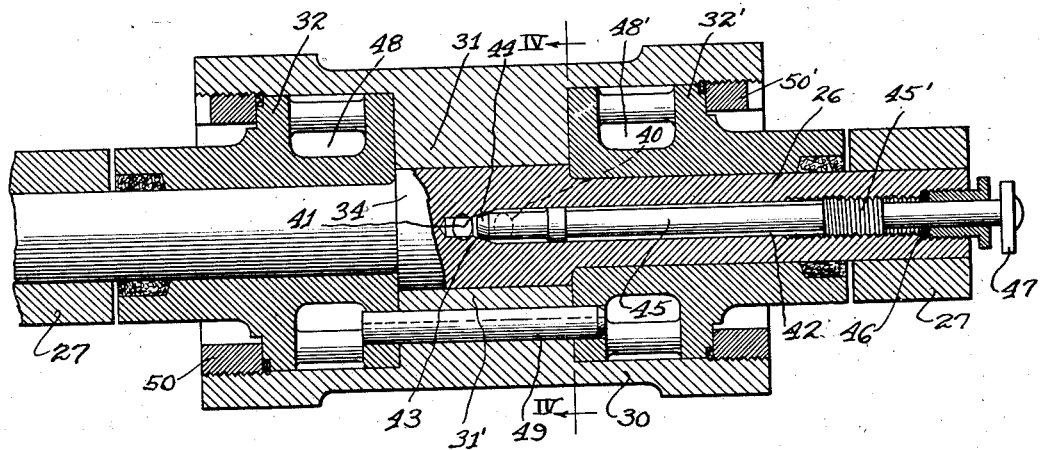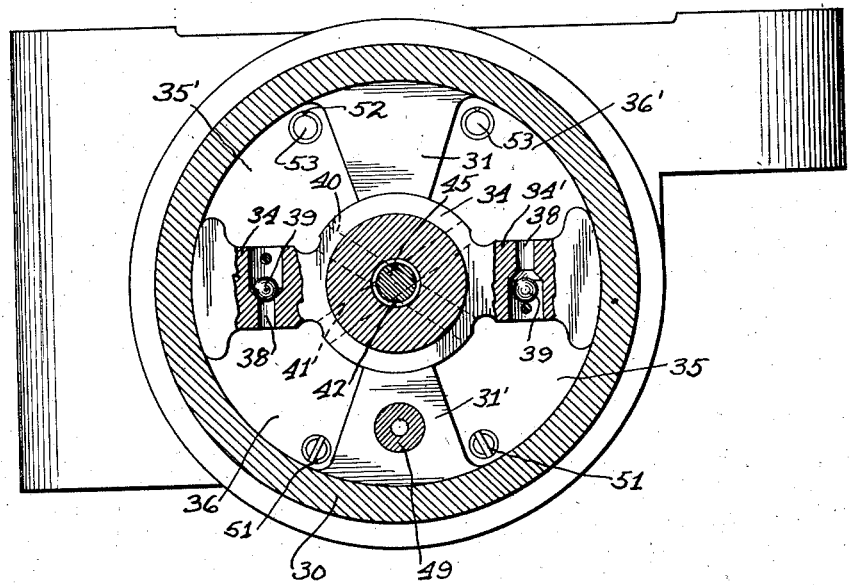

2,043,488

UNITED STATES PATENT OFFICE 2,043,488

HYDRAULIC SHOCK ABSORBER

Ralph F. Peo, Buffalo, N. Y., assignor to Houde Engineering Corporation, Buffalo, N. Y., a corporation of New York Application January 13, 1934, Serial No. 706,487

1 Claim. (Cl. 188—89)

My invention relates to hydraulic shock absorbers of the rotary type adapted particularly for inclusion in the linkages for the individual suspension of vehicle wheels to effectively dampen and absorb road shocks.

The invention includes various features of structure and arrangement shown incorporated in the structure disclosed by the drawings, in which drawings, Figure 1 is a front elevation of the suspension or mounting means for one of the front wheels of the vehicle and showing the inclusion of a shock absorber;

Figure 2 is a plan view of the part shown in Figure 1;

Figure 3 is an enlarged section on plane III—III of Figure 1, and

Figure 4 is an enlarged section on plane IV—IV of Figure 3.

On the arrangement shown in Figures 1 and 2 the front cross beam 10 of the vehicle chassis is supported on a cross leaf spring 11, a spacer frame or block 12 being interposed between the beam and the spring and these parts being rigidly secured together as by means of U or strap bolts 13.

The steering knuckle or wheel supporting block 14 has the upper and lower inwardly extending arms 15 and 16, the block supporting the spindle hub 17 which is secured in journals by a knuckle or king pin 18, the spindle 19 supporting the wheel W.

A supporting bracket 20 depends from the chassis cross beam 10 and a radius rod or frame 21 embraces the lower end of the bracket 20 and is pivoted thereto by a pin or bolt 22. At its outer end the rod or frame 21 embraces the lower arm 16 of the knuckle block and is pivoted thereto by a pin 23 which also supports a shackle 24 which at its lower end receives the outer end of the vehicle spring 11.

Secured to the outer end of the chassis beam 10 is a reinforced frame 25 against the underside of which is secured a shock absorber structure S which is of the rotary or so called "Houdaille" type. The shaft 26 of the shock absorber supports the balanced vane piston structure and serves also as a pivot support for the lever structure 27 which is secured to the ends of the shaft and at its outer end embraces the upper arm 15 of the knuckle member 14, being pivoted thereto by a pin 28. The outer end of the chassis beam 10 together with the bracket 20 and the shock absorber body constitute the rigid or supporting link of the linkage quadrangle whose outer link is the knuckle frame 14, whose lower link or arm is the radius rod or frame 21, and whose upper link or arm is the lever 27 extending from the shock absorber shaft. As the vehicle travels and the wheels encounter the uneven roadway, the wheel supporting or knuckle frame 14 moves vertically relative to the vehicle chassis and against the resistance of the vehicle spring 11, and the wheel movement and spring action is dampened by the shock absorber structure as the shock absorber shaft is turned by the swinging link or lever 27, and shocks are absorbed. The upper link 27 is shorter than the lower link 21, the link differential being such that side movement of the wheel on the roadway is prevented during relative vertical movement of the vehicle body and wheel.

The steering lever 29 extends from the spindle hub 17 and is connected with the steering gear of the vehicle (not shown).

Referring particularly to Figures 3 and 4, I have shown a shock absorber of the rotary balanced type which could be efficiently used with the wheel suspension described. The shock absorber shown comprises the cylindrical housing shell 30 having midway of its ends diametrically opposite upper and lower radial partitions 31, 31'. Cylindrical side wall structures 32 and 32' extend into the ends of the cylindrical housing and abut against the partitions and define a hydraulic fluid containing space. These wall structures form bearings for the shaft 26 which between the walls has a cylindrical hub 34 having bearing engagement with the inner ends of the partitions 31 and 31'. Extending in diametrically opposite directions from the hub are the vanes 34, 34' which oscillate between the partitions as the shaft is rotated, the piston structure with the cylindrical housing and the partitions defining high pressure chambers 35 and 35' and low pressure chambers 36 and 36'.

Through each vane is a bypassage 38 controlled by a check valve 39, the arrangement being such that fluid may flow through the passages 38 from the low pressure chambers to the high pressure chambers but not in reverse direction. Extending diametrally through the piston hub are the two passageways 40 and 41, the passageway 40 communicating with the high pressure chambers and the passageway 41 communicating with the low pressure chambers. The piston shaft has the axial bore 42 extending therethrough from one end thereof which bore at its inner end intersects the passageways 40 and 41 and between the passageways the bore is contracted to form a conical valve seat 43 for a needle valve 44 from which a stem 45 extends through the shaft bore and from the outer end thereof. The bore has internal threads engaged by a threaded section 45' on the stem so that when the stem is turned the needle valve will be moved toward or away from its seat in order to determine the resistance to the flow of the fluid from the high pressure chambers to the low pressure chambers. During a bump stroke of the piston structure, that is when the vehicle chassis and wheel move toward each other, fluid may flow through the passageways 38 and also through the restricted passageway provided by the needle valve. However during rebound stroke, when the chassis and wheel separate, the check valves 39 will close the passageways 38 so that the fluid can flow only through the restricted passage provided by the needle valve. A packing gland 46 is provided for the needle valve stem at the outer end of the piston shaft and a short lever 47 is provided at the outer end of the stem by which it may be readily turned for setting of the needle valve for adjustment of the resistance bypassages. As has already been described, the lever or link structure 27 is keyed or otherwise rigidly secured to the ends of the piston shaft 26 and at its outer end is pivoted to the knuckle member 14 so that during relative vertical movement between the chassis and the wheel the lever structure 27 swings and rotates the shaft 26 against the hydraulic fluid resistance of the shock absorber.

The end wall 32 of the shock absorber has the annular space which with the cylindrical housing wall 30 forms a hydraulic fluid reservoir or replenishing chamber 48, the wall structure 32' being provided with a similar replenishin chamber 48'. These chambers, at their lower ends, communicate with each other through a pin 49 which extends through the lower partition wall 31' and which serves also to properly align the wall structures 32 and 32' when they are inserted in the housing 30. After insertion of the wall structure ring nuts 50 and 50' are threaded into the respective ends of the housing 30 to abut the wall structures and clamp them securely against the ends of the partition walls.

The lower compression chambers 35 and 36 are connected with the replenishing chambers 48 and 48' through check valve controlled passageways 51 through which fluid may flow from the replenishing chamber into the pressure chambers but not in reverse direction. The upper pressure chambers are connected with the upper part of either one of the replenishing chambers through restricted passageways 52 which may be in the form of slots cut in plugs 53 extending through the respective wall structure 32 or 32'. Any air or gas collecting at the top of the pressure chambers may find its way to the reservoir chamber but cannot return to the pressure chambers.

It is evident, that with the use of a rotary type of hydraulic shock absorber such as described, with its balanced vanes and hydraulic fluid flow, there will be no hydraulic reaction in the shock absorber which would add stresses and strains to the shock absorber shaft in addition to those which the shaft must bear in its share of the support of the load of the vehicle, and that there will therefore be less wear and tear on the shock absorber shaft bearings. Where an unbalanced type of shock absorber is employed the hydraulic reaction applied against the bearings may be of such magnitude that the bearings will soon give and break down.

I have shown and described a practical and efficient embodiment of the various features of my invention but I do not desire to be limited to the exact construction, arrangement, and operation shown and described as changes and modifications may be made without departing from the scope of the invention.

I claim as folows:

In a hydraulic shock absorber, an annular body wall, end wall structures within the ends of said annular wall forming therewith a hydraulic working chamber, a shaft extending through and journalled at its ends in said end walls and having a piston vane operable in said working chamber to displace hydraulic fluids therein, a valve within said shaft for controlling the flow of the fluid displaced by said piston vane when said shaft oscillates, said valve being adjustable from the end of said shaft, and a fluid reservoir formed in each of said end walls and being entirely within said annular wall, means interconnecting said reservoirs, and means connecting said reservoirs with said working chamber.

RALPH F. PEO.